(12) United States Patent
Kim et al.

(10) Patent No.: US 11,967,702 B2
(45) Date of Patent: Apr. 23, 2024

(54) SULFUR-CARBON COMPOSITE, AND CATHODE AND LITHIUM SECONDARY BATTERY EACH COMPRISING SAME

(71) Applicant: LG CHEM, LTD., Seoul (KR)

(72) Inventors: Bong Soo Kim, Daejeon (KR); Seungbo Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 499 days.

(21) Appl. No.: 17/298,878

(22) PCT Filed: May 13, 2020

(86) PCT No.: PCT/KR2020/006256
§ 371 (c)(1),
(2) Date: Jun. 1, 2021

(87) PCT Pub. No.: WO2020/231162
PCT Pub. Date: Nov. 19, 2020

(65) Prior Publication Data
US 2022/0059817 A1    Feb. 24, 2022

(30) Foreign Application Priority Data

May 14, 2019   (KR) ........................ 10-2019-0056010
May 12, 2020   (KR) ........................ 10-2020-0056606

(51) Int. Cl.
*H01M 4/36*      (2006.01)
*H01M 4/02*      (2006.01)
(Continued)

(52) U.S. Cl.
CPC ........... *H01M 4/362* (2013.01); *H01M 4/133* (2013.01); *H01M 4/38* (2013.01); *H01M 4/625* (2013.01);
(Continued)

(58) Field of Classification Search
CPC ....... H01M 2220/20; H01M 2004/028; H01M 10/0525; H01M 4/362; H01M 4/38; H01M 4/625
See application file for complete search history.

(56) References Cited

U.S. PATENT DOCUMENTS

2013/0164625 A1   6/2013   Manthiram et al.
2013/0171339 A1*  7/2013   Wang ................... H01M 4/625
                                              977/734
(Continued)

FOREIGN PATENT DOCUMENTS

CN        104078700 A     10/2014
CN        204118182 U     1/2015
(Continued)

OTHER PUBLICATIONS

Machine Translation of KR20150143224A (Dec. 7, 2023) (Year: 2023).*

(Continued)

*Primary Examiner* — Matthew J Merkling
(74) *Attorney, Agent, or Firm* — Birch, Stewart, Kolasch & Birch, LLP

(57) ABSTRACT

Disclosed is a sulfur-carbon composite, and a positive electrode for a lithium secondary battery and a lithium secondary battery including the same. More specifically, since the carbon contained in the sulfur-carbon composite includes carbon of various shapes and in particular, includes sheet-type carbon in a certain content, when the sulfur-carbon composite is applied as a positive electrode active material of a lithium secondary battery, the performance of the lithium secondary battery may be improved by preventing the leaching of sulfur and improving the reaction rate at the positive electrode.

12 Claims, 6 Drawing Sheets

(51) Int. Cl.
*H01M 4/133* (2010.01)
*H01M 4/38* (2006.01)
*H01M 4/62* (2006.01)
*H01M 10/0525* (2010.01)

(52) U.S. Cl.
CPC .. *H01M 10/0525* (2013.01); *H01M 2004/028* (2013.01); *H01M 2220/20* (2013.01)

(56) References Cited

U.S. PATENT DOCUMENTS

| | | | |
|---|---|---|---|
| 2013/0183547 A1* | 7/2013 | Kourtakis | H01M 4/0402 252/182.1 |
| 2018/0006325 A1 | 1/2018 | Hyun et al. | |
| 2018/0245203 A1 | 8/2018 | Li et al. | |
| 2020/0280052 A1 | 9/2020 | Cho et al. | |

FOREIGN PATENT DOCUMENTS

| | | |
|---|---|---|
| CN | 106058173 A | 10/2016 |
| CN | 107978736 A | 5/2018 |
| CN | 109314228 A | 2/2019 |
| CN | 109346678 A | 2/2019 |
| CN | 109473639 A | 3/2019 |
| KR | 10-2014-0107582 A | 9/2014 |
| KR | 10-2015-0001098 A | 1/2015 |
| KR | 20150143224 A * | 12/2015 |
| KR | 10-2016-0037084 A | 4/2016 |
| KR | 10-2016-0051610 A | 5/2016 |
| KR | 10-2016-0083567 A | 7/2016 |
| KR | 10-2018-0024917 A | 3/2018 |
| KR | 10-2018-0099572 A | 9/2018 |
| KR | 10-1957248 B1 | 3/2019 |
| KR | 10-2019-0050424 A | 5/2019 |

OTHER PUBLICATIONS

Machine Translation of CN109346678 A (Dec. 7, 2023) (Year: 2023).*

Machine Translation of CN107978736A (Dec. 7, 2023) (Year: 2023).*

Extended European Search Report for European Application No. 20806156.4, dated Jan. 24, 2022.

International Search Report for PCT/KR2020/006256 dated Sep. 1, 2020.

Jeong et al., "Electrochemical properties of sulfur/carbon composite for lithium sulfur battery applications", Journal of Industrial Science and Technology Institute, Jun. 2016, vol. 30, No. 1, pp. 51-54.

Geng et al., "Isothermal sulfur condensation into carbon nanotube/nitrogen-doped graphene composite for high performance lithium-sulfur batteries," Journal of Materials Science: Materials in Electronics, vol. 29, 2018, pp. 10071-10081, 11 pages total.

Kim et al., "Freestanding sulfur-graphene oxide/carbon composite paper as a stable cathode for high performance lithium-sulfur batteries," Electrochimica Acta, vol. 299, 2019, pp. 27-33, 7 pages total.

* cited by examiner

[Figure 1a]
11
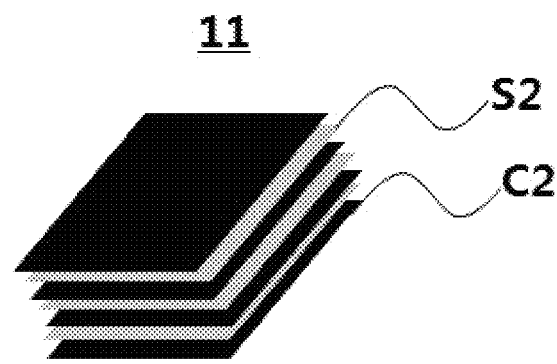
[Figure 1b]
12
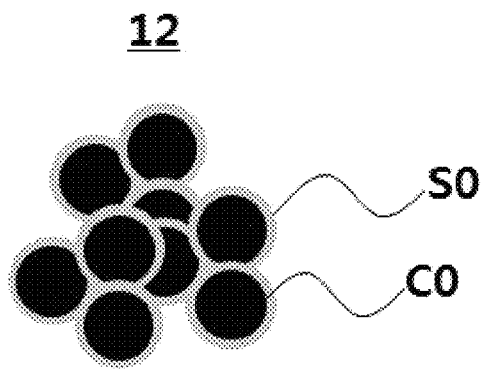

[Figure 1c]
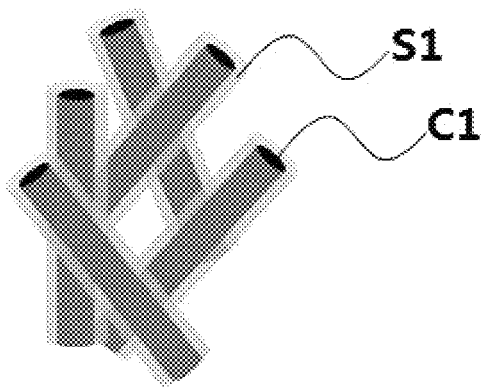

[Figure 2]
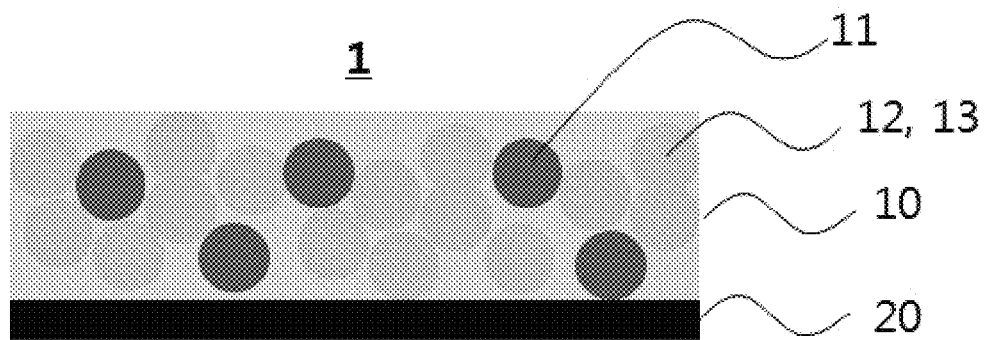
[Figure 3a]
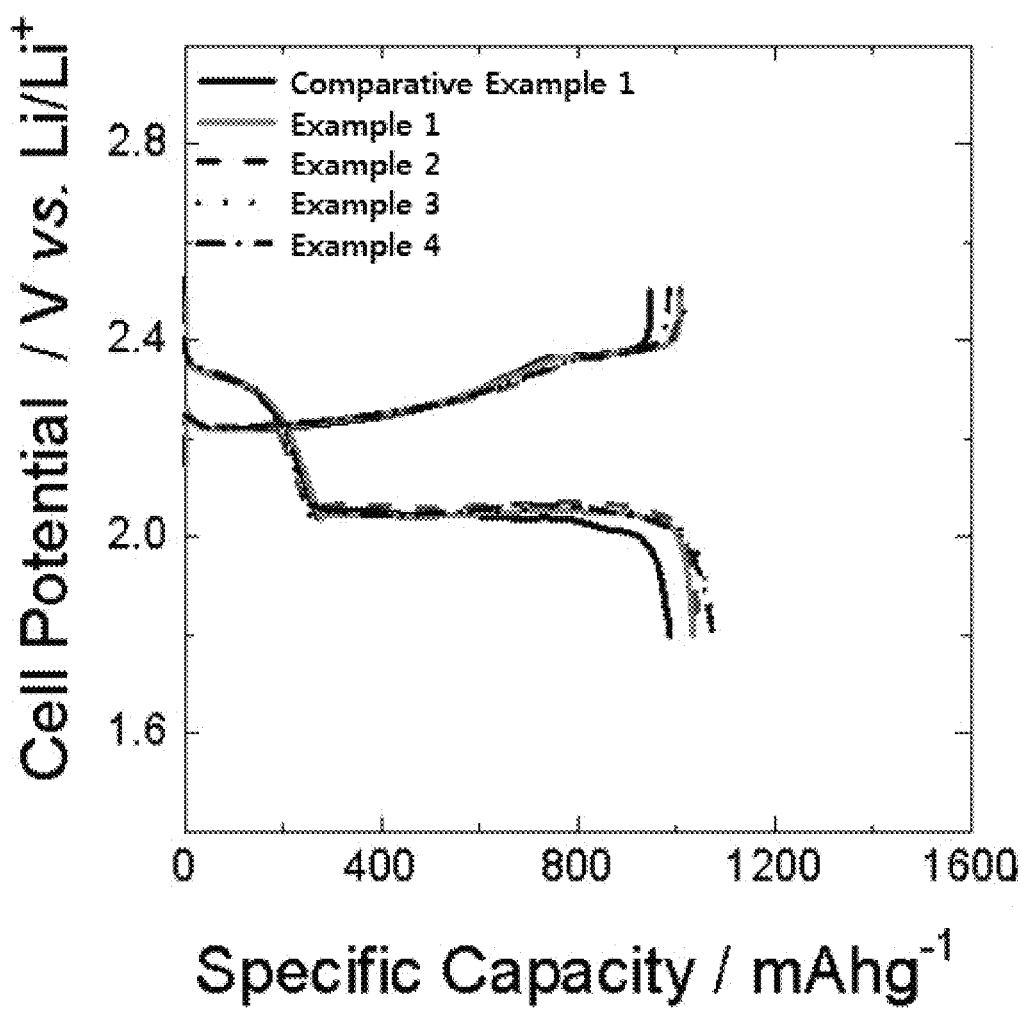

[Figure 3b]
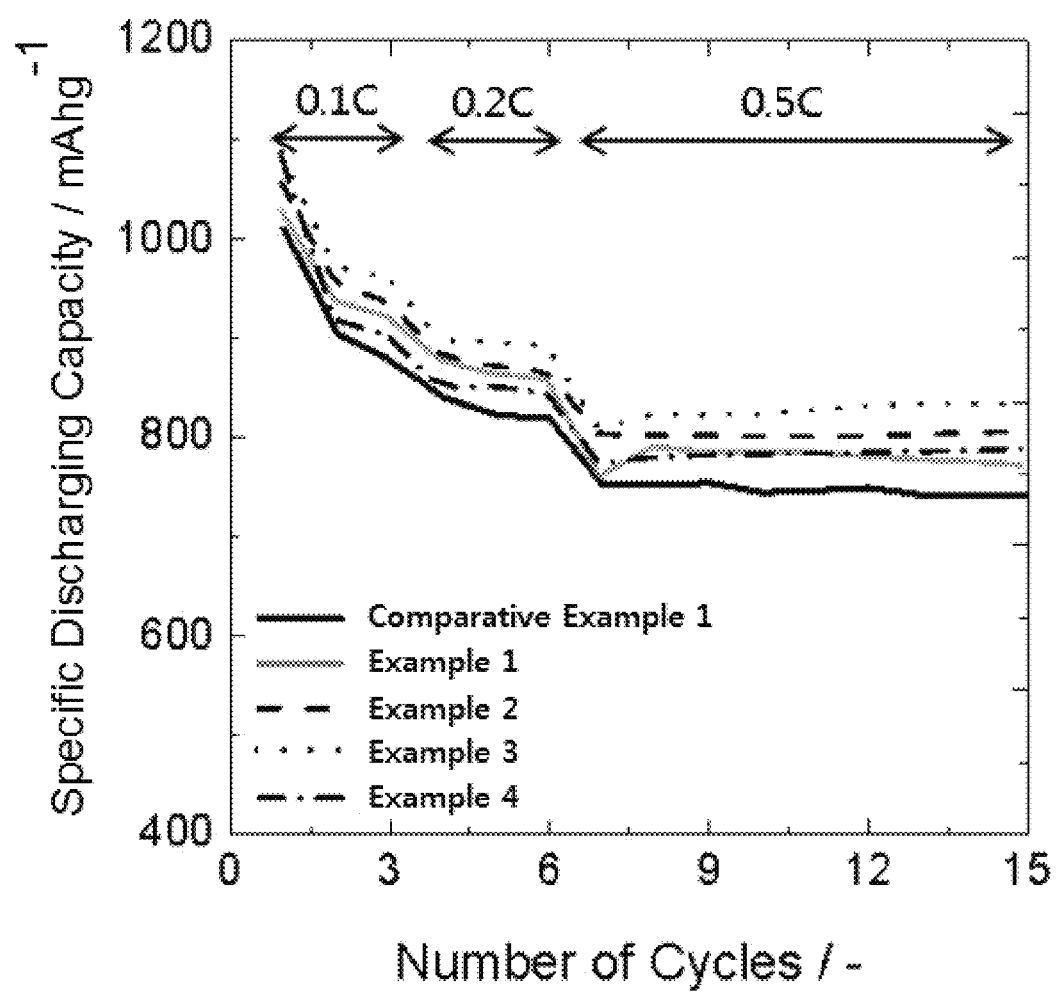

[Figure 4a]
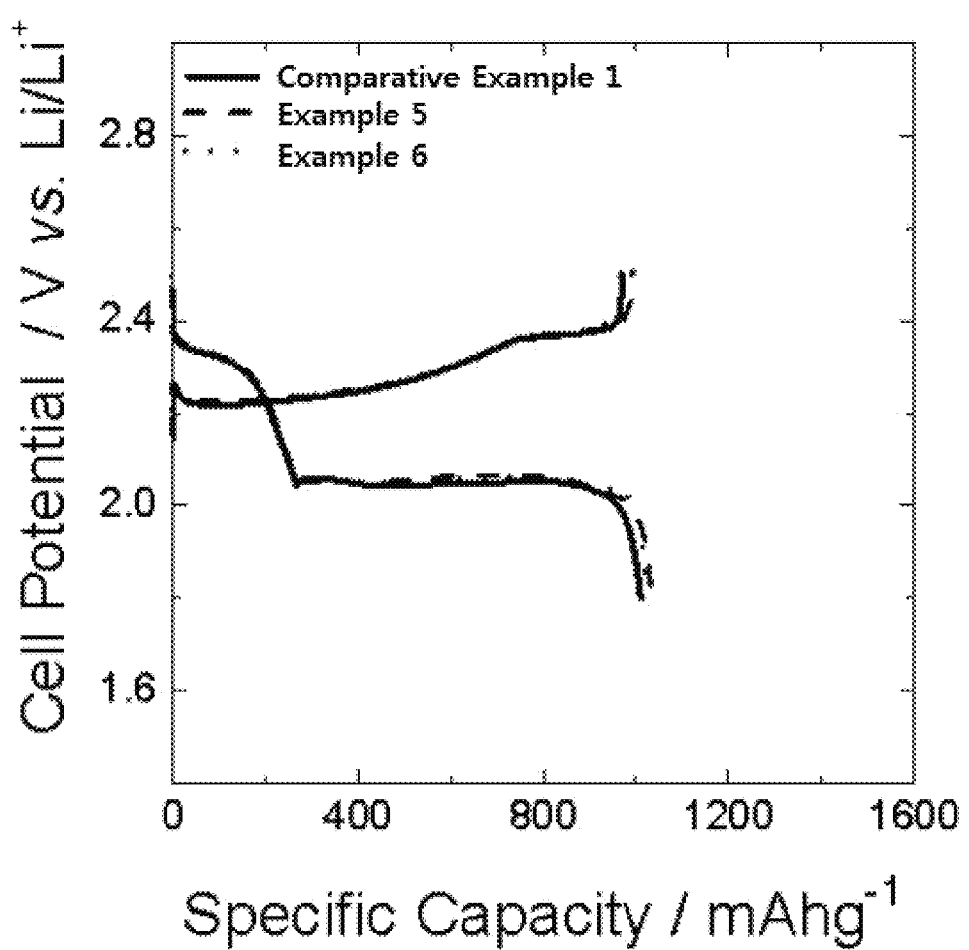

[Figure 4b]
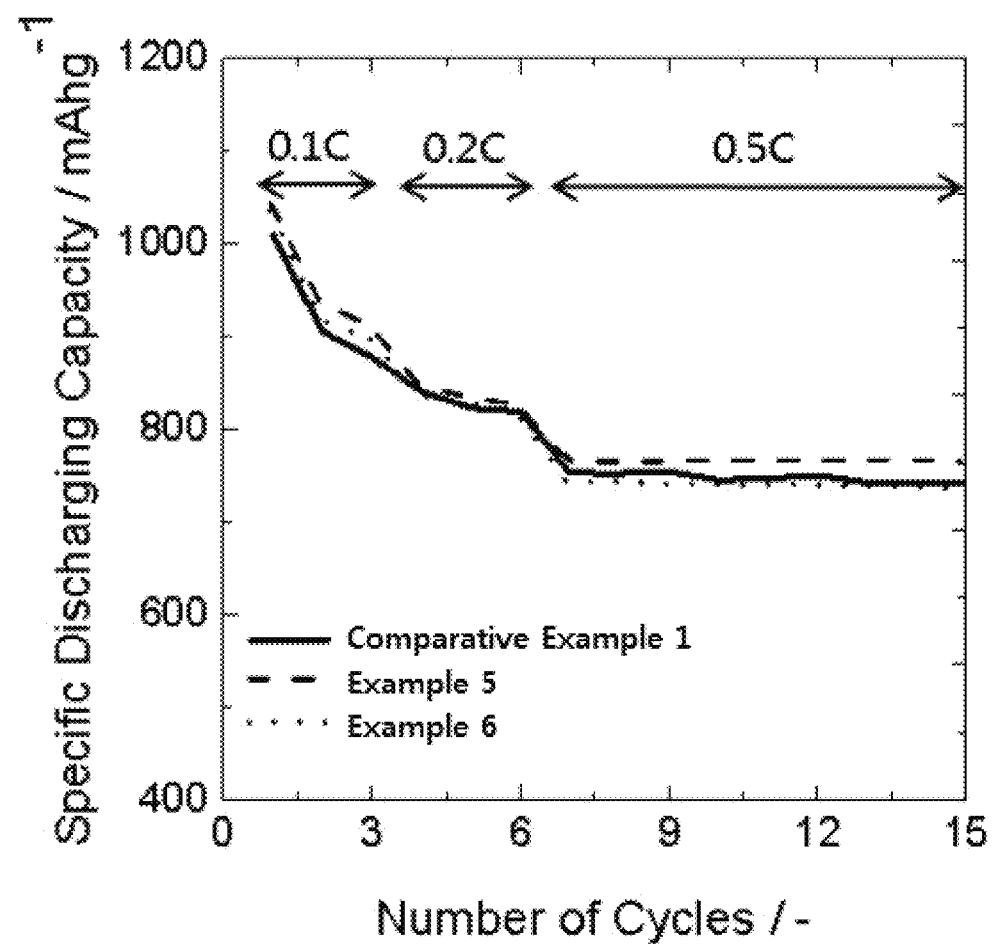
[Figure 5]
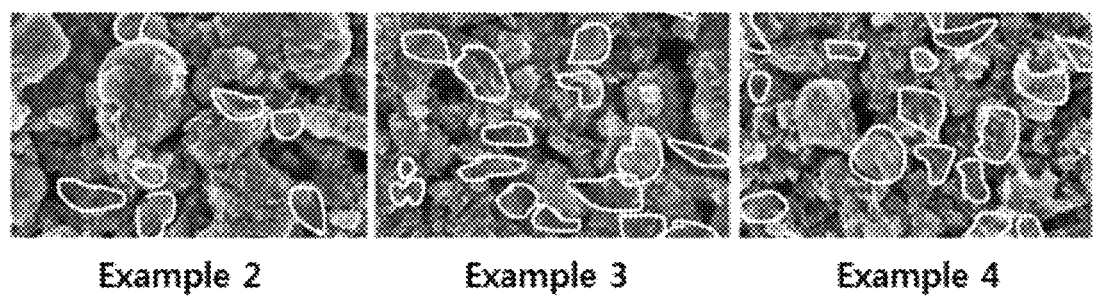
Example 2      Example 3      Example 4

SULFUR-CARBON COMPOSITE, AND CATHODE AND LITHIUM SECONDARY BATTERY EACH COMPRISING SAME

TECHNICAL FIELD

One aspect of the present disclosure claims the benefits of priorities based on Korean Patent Application No. 10-2019-0056010 filed on May 14, 2019 and Korean Patent Application No. 10-2020-0056606 filed on May 12, 2020, the entire contents of which are incorporated herein by reference.

One aspect of the present disclosure relates to a sulfur-carbon composite that can be applied as a positive electrode material for a lithium secondary battery, and a positive electrode and a lithium secondary battery comprising the same.

BACKGROUND ART

Recently, with the rapid development in the field of electronic devices and electric vehicles, the demand for secondary batteries is increasing. In particular, with the trend toward miniaturization and weight reduction of portable electronic devices, there is a growing demand for secondary batteries having a high energy density that can cope with them.

Among the secondary batteries, a lithium-sulfur secondary battery is a secondary battery that uses sulfur-based compounds having a sulfur-sulfur bond as a positive electrode active material, and uses alkali metals such as lithium, carbon-based materials in which intercalation and deintercalation of metal ions such as lithium ions occur, or silicon or tin, which forms an alloy with lithium, as a negative electrode active material. Specifically, in the case of the lithium-sulfur secondary battery, during the discharging which is a reduction reaction, as the sulfur-sulfur bond is cut off, the oxidation number of sulfur decreases, and during the charging which is an oxidation reaction, as the oxidation number of sulfur increases, the sulfur-sulfur bond is re-formed. Through this oxidation-reduction reaction, electrical energy is stored and generated.

In particular, sulfur used as a positive electrode active material in lithium-sulfur secondary batteries has a theoretical energy density of 1675 mAh/g, and thus has a theoretical energy density of about five times higher than the positive electrode active material used in conventional lithium secondary batteries, thereby enabling batteries to express high power and high energy density. In addition, since sulfur has the advantage of being cheap and rich in resources and thus being readily available and environmentally friendly, sulfur is drawing attention as an energy source not only for portable electronic devices but also for medium and large devices such as electric vehicles.

However, since sulfur has no electrical conductivity, sulfur is applied as an electrochemical positive electrode active material by forming a sulfur-carbon composite with a porous carbon material. In the case of sulfur-carbon composite applied as a positive electrode active material in this way, sulfur (S) forms $Li_2S$ and reduces lithium by electrons transmitted through the conductor and carbon in the sulfur-carbon composite and lithium ions transferred from the negative electrode through the electrolyte solution.

Natural sulfur exists in the form of a ring in the form of $S_8$, and undergoes the form of lithium-polysulfide such as $Li_2S_8$, $Li_2S_6$, $Li_2S_4$ in the process of forming $Li_2S$ with the discharge of the battery. Since these lithium-polysulfide is well soluble in the electrolyte solution, there is a problem that the lithium-polysulfide moves to the negative electrode in a state dissolved in the electrolyte solution, resulting in a reduced lifetime (shuttle effect).

In addition, in the case of attempting to increase the energy density by minimizing the use of carbon in the sulfur-carbon composite and increasing the sulfur content, if the sulfur content is increased, since the transfer resistance of electrons and lithium ions is increased, an optimum carbon structure is required.

Korean Laid-open Patent Publication No. 2016-0051610, which is a patent application that applies carbon having various types of structures to sulfur-carbon composite, relates to a positive electrode material for a lithium-sulfur secondary battery, and discloses a technique using sulfur-carbon composite as a positive electrode material, which comprises a mixture of sulfur-carbon nanotube composite and sulfur-graphene composite.

However, since carbon materials have advantages and disadvantages depending on their shape, there is a need to develop a technology for manufacturing a sulfur-carbon composite that is effective for improving the performance of the lithium-sulfur secondary battery, by combining various types of carbon materials, which are used in the production of sulfur-carbon composites, in optimum condition, in order to maximize the advantages of the form of these carbon materials and minimize the disadvantages.

PRIOR ART DOCUMENT

Patent Document (Patent Document 1) Korean Patent Publication No. 2016-0051610

DISCLOSURE

Technical Problem

Accordingly, the inventors of One aspect of the present disclosure intend to provide a sulfur-carbon composite, which can improve the performance of the battery by including sheet-type carbon in a certain ratio and also including at least one carbon of dot-type carbon and linear carbon, and thus facilitating contact with the electrolyte solution, thereby maintaining the reaction rate, while limiting the leaching of sulfur, when preparing a sulfur-carbon composite applied as the positive electrode active material for the lithium secondary battery.

Therefore, it is an object of one aspect of the present disclosure to provide a sulfur-carbon composite containing sheet-type carbon in a certain ratio.

It is another object of another aspect of the present disclosure to provide a positive electrode for a lithium secondary battery comprising a sulfur-carbon composite containing the sheet-type carbon in a certain ratio.

It is still another object of another aspect of the present disclosure to provide a lithium secondary battery comprising a sulfur-carbon composite containing the sheet-type carbon in a certain ratio.

Technical Solution

In order to achieve the above objects, one aspect of the present disclosure provides a sulfur-carbon composite comprising sheet-type carbon, wherein the sheet-type carbon is contained in an amount of more than 0% by weight and less than 50% by weight based on the total weight of the carbon.

Another aspect of the present disclosure also provides a positive electrode for a lithium secondary battery comprising the sulfur-carbon composite described above.

Another aspect of the present disclosure also provides a lithium secondary battery comprising the positive electrode described above.

Advantageous Effects

The sulfur-carbon composite according to one aspect of the present disclosure can improve performance of a battery by including sheet-type carbon or sheet-type carbon together with various types of carbon.

The sulfur-carbon composite, when applied to a positive electrode for a lithium secondary battery, can prevent the leaching of sulfur while increasing the energy density by containing sheet-type carbon and thus supporting a large amount of sulfur.

In addition, the sulfur-carbon composite described above can comprise a sulfur-carbon composite in the form where sulfur is exposed to the outside, like a sulfur-carbon composite containing dot-type carbon or a linear carbon-composite containing linear carbon and thus facilitate the contact of sulfur with the electrolyte solution, thereby maintaining the reaction rate and preventing voltage drop.

In addition, when the sulfur-carbon composite is applied to a positive electrode of a lithium secondary battery, the discharging capacity and high rate characteristics of the lithium secondary battery can be improved.

DESCRIPTION OF DRAWINGS

FIG. 1a to 1c are schematic views of sheet-type sulfur-carbon composites, dot-type sulfur-carbon composites, and linear sulfur-carbon composites comprised in sulfur-carbon composites according to the embodiment of the invention, respectively.

FIG. 2 is a schematic view of a positive electrode for a lithium secondary battery including sulfur-carbon composites according to the embodiment of the invention.

FIG. 3a is a graph showing the initial discharging performance of lithium-sulfur secondary batteries in which sulfur-carbon composites prepared in Examples 1 to 4 and Comparative Example 1 respectively were applied to the positive electrode, and FIG. 3b is a graph showing the high rate characteristics of lithium-sulfur secondary batteries in which sulfur-carbon composites prepared in Examples 1 to 4 and Comparative Example 1 respectively were applied to the positive electrode.

FIG. 4a is a graph showing the initial discharging performance of lithium-sulfur secondary batteries in which sulfur-carbon composites prepared in Examples 5 and 6 and Comparative Example 1 respectively were applied to the positive electrode, and FIG. 4b is a graph showing the high rate characteristics of lithium-sulfur secondary batteries in which sulfur-carbon composites prepared in Examples 5 and 6 and Comparative Example 1 respectively were applied to the positive electrodes.

FIG. 5 is a picture by a scanning electron microscope (SEM) of sulfur-carbon composites prepared in Examples 2 to 4, respectively.

BEST MODE

Hereinafter, the present invention will be described in more detail.

The term "dot-type carbon" as used herein refers to carbon having a shape similar to a dot, and is also referred to as 0-dimensional carbon. In addition, the sulfur-carbon composite containing the "dot-type carbon" is called "dot-type sulfur-carbon composite".

The term "linear carbon" as used herein refers to carbon having a shape similar to a line, and is also referred to as 1-dimensional carbon. In addition, the sulfur-carbon composite containing the "linear carbon" is referred to as "linear sulfur-carbon composite".

The term "sheet-type carbon" as used herein refers to carbon having a shape similar to a sheet, and is also referred to as 2-dimensional carbon. In addition, the sulfur-carbon composite containing the "sheet-type carbon" is referred to as "sheet-type sulfur-carbon composite".

Sulfur-Carbon Composite

One aspect of the present disclosure relates to a sulfur-carbon composite containing carbon of various shapes. Since the shape of the sulfur-carbon composite to be formed may be determined according to the shape of the carbon, the sulfur-carbon composite may have various shapes according to the shape of the carbon.

For example, the shape of the sulfur-carbon composite may have the same shape as that of carbon. In other words, the sulfur-carbon composite containing the sheet-type carbon may be a sheet-type sulfur-carbon composite having a sheet shape, the sulfur-carbon composite containing the dot-type carbon may be a dot-type sulfur-carbon composite having a dot shape, and the sulfur-carbon composite containing the linear carbon may be a shape of a linear sulfur-carbon composite.

The sulfur-carbon composite according to one aspect of the present disclosure may comprise sheet-type carbon. In addition, the sulfur-carbon composite may further comprise at least one selected from dot-type carbon and linear carbon in addition to sheet-type carbon.

The sulfur-carbon composite according to one aspect of the present disclosure may comprise 40 to 95 wt. % of sulfur and 5 to 60 wt. % of carbon. The content of sulfur contained in the sulfur-carbon composite may be 40 wt. % or more, 45 wt. % or more, 50 wt. % or more, 55 wt. % or more, or 60 wt. % or more, and also may be 75 wt. % or less, 80 wt. % or less, 85 wt. % or less, 90 wt. % or less, or 95 wt. % or less. If sulfur is contained in the prescribed range, the energy density of the lithium secondary battery may be improved. Therefore, if the content of sulfur is less than 40 wt. %, the energy density may be lowered, and if the content of sulfur is more than 95 wt. %, the electron and lithium ion transfer resistance may be increased.

In addition, the content of carbon contained in the sulfur-carbon composite may be 5 wt. % or more, 10 wt. % or more, 15 wt. % or more, 20 wt. % or more, or 25 wt. % or more, and also may be 40 wt. % or less, 45 wt. % or less, 50 wt. % or less, 55 wt. % or less, or 60 wt. % or less. If carbon is contained in the prescribed range, the electron conductivity and lithium ion conductivity may be increased. Therefore, if the content of carbon is less than 5 wt. %, the electron conductivity and the lithium ion conductivity may be lowered, and if the content of carbon is more than 60 wt. %, the content of sulfur may be relatively lowered and energy density may be lowered.

In one aspect of the present disclosure, sulfur may be at least one selected from the group consisting of sulfur ($S_8$), $Li_2S_n(n \geq 1)$, organic sulfur compounds and carbon-sulfur polymers[$(C_2S_x)_n$, wherein x is an integer from 2.5 to 50, and $n \geq 2$].

In one aspect of the present disclosure, carbon may further comprise at least one selected from dot-type carbon and linear carbon in addition to sheet-type carbon. Hereinafter, one aspect of the present disclosure will be described in more detail with reference to the drawings.

FIG. 1a is a schematic view of the sheet-type sulfur-carbon composite according to embodiment of the invention.

Referring to FIG. 1a, the sheet-type sulfur-carbon composite (11) has a form in which sulfur ($S_2$) is inserted between sheet-type carbons (C2), that is, a form in which sheet-type carbon (C2) is carrying sulfur ($S_2$) and surrounding it. Due to this morphological feature, when the sheet-type sulfur-carbon composite (11) is applied as a positive electrode active material of a lithium secondary battery, the leaching of sulfur may be prevented.

The sheet-type carbon (C2) may be contained in an amount of more than 0 wt. % and less than 50 wt. % relative to the total weight of carbon contained in the sulfur-carbon composite according to one aspect of the present disclosure. Specifically, the content of the sheet-type carbon (C2) may be more than 0 wt. %, 5 wt. % or more, or 10 wt. % or more, relative to the total weight of the carbon, and also may be wt. % or less, 35 wt. % or less, 40 wt. %, or less, 45 wt. % or less, or less than 50 wt. %, relative to the total weight of the carbon. If the content of the sheet-type carbon (C2) is 0 wt. %, the effect of preventing leaching of sulfur at the positive electrode is insignificant, the effect of improving the performance by sheet-type carbon may not be obtained. If the content of the sheet-type carbon (C2) is 50 wt. % or more, since the electrolyte solution is not smoothly entered and out of the positive electrode, the lithium ion conductivity is lowered, so that voltage drop may occur and thus sufficient battery capacity may not be implemented.

The sheet-type carbon (C2) may be at least one selected from the group consisting of non-graphene oxide, graphene oxide, reduced graphene oxide, doped graphene and carbon nanoribbon, preferably reduced graphene oxide.

The specific surface area of the sheet-type carbon (C2) may be greater than the sum of specific surface areas of other carbons included in the sulfur-carbon composite. For example, if the sulfur-carbon composite includes sheet-type carbon, dot-type carbon and linear carbon, the specific surface area of sheet-type carbon may be larger than the sum of specific surface areas of dot-type carbon and linear carbon.

The specific surface area of the sheet-type carbon (C2) may be 200 $m^2$/g to 1000 $m^2$/g, specifically, 200 $m^2$/g or more, 300 $m^2$/g or more, 400 $m^2$/g or more, or 500 $m^2$/g or more, and may be 700 $m^2$/g or less, 800 $m^2$/g or less, 900 $m^2$/g or less, or 1000 $m^2$/g or less. When a sheet-type carbon (C2) having the specific surface area as described above is used, a larger amount of sulfur may be supported, thereby improving the capacity of the battery while suppressing the leaching of sulfur.

The content of sulfur ($S_2$) contained in the sheet-type sulfur-carbon composite (11) may be 10 to 45 wt. % based on the total weight of sulfur contained in the sulfur-carbon composite, and specifically may be 10 wt. % or more, 15 wt. % or more, or 20 wt. % or more, and also 35 wt. % or less, 40 wt. % or less or 45 wt. % or less. If the content of sulfur ($S_2$) contained in the sheet-type sulfur-carbon composite (11) is less than the above range, the sulfur content in the battery is low, and the battery capacity is excessively reduced. If the content of sulfur ($S_2$) included in the sheet-type sulfur-carbon composite (11) exceeds the above range, electrical conductivity in the electrode may be excessively reduced, thereby increasing resistance.

FIG. 1b is a schematic view of the dot-type sulfur-carbon composite according to embodiment of the invention, and FIG. 1c is a schematic view of the linear sulfur-carbon composite according to the embodiment of the invention.

Referring to FIGS. 1b and 1c, the dot-type sulfur-carbon composite (12) has a core-shell shape because sulfur (S0) is formed on the surface of dot-type carbon (C0), and the linear sulfur-carbon composite 13 has a tube shape because sulfur (S1) is formed inside and/or on the surface of linear carbon (C1), and thus they have a form in which sulfur (S0, S1) is exposed to the outside. Due to this morphological feature, when the dot-type sulfur-carbon composite (12) or the linear sulfur-carbon composite (13) is applied as a positive electrode active material for the lithium secondary battery, sulfur exposed on the surface (S0, S1) is easy to contact with the electrolyte solution, and the may prevent voltage drop, thereby improving the battery performance.

At least one carbon selected from dot-type carbon (C0) and linear carbon (C1) may be 50 wt. % or more, and less than 100 wt. % relative to the total weight of carbon contained in the sulfur-carbon composite according to one aspect of the present disclosure, and specifically may be 50 wt. % or more, 55 wt. % or more, 60 wt. % or more, 65 wt. % or more, or 70 wt. % or more, and also 80 wt. % or less, 85 wt. % or less, 90 wt. % or less, 95 wt. % or less, or less than 100 wt. %. If the content of the at least one carbon selected from dot-type carbon (C0) and linear carbon (C1) is less than 50 wt. %, since the electrolyte solution is not smoothly entered and out of the positive electrode, the lithium ion conductivity is lowered, so that voltage drop may occur and thus sufficient battery capacity may not be implemented. If the content of carbon is 100 wt. %, since there is no sheet-type carbon (C2), the effect of preventing the leaching of sulfur from the positive electrode is insufficient, so that the discharging capacity and lifetime characteristics of the lithium secondary battery may be deteriorated.

The dot-type carbon (C0) may be at least one selected from the group consisting of Ketjen black, Denka black, acetylene black, Super-p and fullerene, preferably Ketjen black.

The linear carbon (C1) may be at least one selected from the group consisting of carbon nanotube (CNT) and carbon fiber, preferably carbon nanotube.

The content of sulfur (S0, S1) contained in at least one selected from the dot-type sulfur-carbon composite (12) and the linear sulfur-carbon composite (13) may be 55 to 90 wt. % based on the total weight of sulfur contained in the sulfur-carbon composite, and specifically may be 55 wt. % or more, 60 wt. % or more, or 65 wt. % or more, and also 85 wt. % or less, 90 wt. % or less, or 95 wt. % or less. If the content of sulfur (S0, $S_1$) is less than the above range, since the sulfur content in the battery is low, the battery capacity is excessively reduced, and if the content of sulfur (S0, S1) exceeds the above range, since the electrical conductivity in the electrode is excessively reduced, resistance may be increased.

Preparation of Sulfur-Carbon Composite

Also, in another aspect of the present disclosure, the method for preparing the sulfur-carbon composite is not particularly limited, and a method for preparing a sulfur-carbon composite commonly used in the art may be used.

In addition, the form of carbon contained in the sulfur-carbon composite according to another aspect of the present disclosure, that is, sheet-type carbon, dot-type carbon, or linear carbon may all be applied to the same method for preparing the sulfur-carbon composite.

For example, the sulfur-carbon composite may be prepared by a melt diffusion method. The melt diffusion method is a preparing method in which sulfur penetrates into carbon particles by melting sulfur through heating. In this case, the heat treatment may comprise various direct or indirect heating methods.

The method for preparing the composite of sulfur-carbon according to another aspect of the present disclosure may comprise the steps of (S1) mixing sulfur and carbon; and heat-treating the mixture of sulfur and carbon formed in step (S1).

In step (S1), the amount and type of sulfur and carbon used are as described above.

In addition, the heat treatment temperature in step (S2) is a temperature that allows sulfur to melt and permeate the carbon to be supported thereon and may be higher than the melting point of sulfur.

Specifically, the temperature during the heat treatment may be 100 to 200° C., specifically, 100° C. or higher, 105° C. or higher, 110° C. or higher, 115° C. or higher, or 120° C. or higher, and 180° C. or lower, 185° C. or lower, 190° C. or lower, 195° C. or lower, 200° C. or lower, and the heat treatment may be performed by a melt diffusion method. If the heat treatment temperature is less than the above range, since the process in which sulfur melts and penetrates into carbon does not proceed, the sulfur-carbon composite itself may not be prepared. If the heat treatment temperature exceeds the above range, the loss rate of sulfur due to vaporization of sulfur is increased, and the sulfur-carbon composite is denatured, so that the effect of improving the performance of the battery may be insignificant when applied as a positive electrode material for a lithium secondary battery.

In addition, the sheet-type sulfur-carbon composite, the dot-type sulfur-carbon composite and the linear sulfur-carbon composite according to another aspect of the present disclosure may be separately prepared according to the method of preparing the sulfur-carbon composite as described above, or may be prepared simultaneously.

Lithium Secondary Battery

Another aspect of the present disclosure also relates to a lithium secondary battery comprising the sulfur-carbon composite as described above. At this time, the sulfur-carbon composite may be preferably comprised as a positive electrode active material.

The lithium secondary battery according to another aspect of the present disclosure may include a positive electrode, a negative electrode, a separator and an electrolyte interposed therebetween.

FIG. 2 is a schematic view of a positive electrode for a lithium secondary battery comprising the sulfur-carbon composite according to the embodiment of the invention.

Referring to FIG. 2, the positive electrode (1) for the lithium secondary battery may comprise a positive electrode current collector (20) and a positive electrode active material layer (10) having a positive electrode active material formed on the positive electrode current collector (20).

The positive electrode active material may comprise a sulfur-carbon composite, the sulfur-carbon composite may comprise a sheet-type sulfur-carbon composite (11), and also may comprise at least one selected from a dot-type sulfur-carbon composite (12) and a linear sulfur-carbon composite (13).

In addition, a lithium-containing transition metal oxide may be used as the positive electrode active material, and for example, any one selected from the group consisting of $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-y}Co_yO_2$, $LiCo_{1-y}Mn_yO_2$, $LiNi_{1-y}Mn_yO_2$ (0≤y<1), $Li(Ni_aCo_bMn_c)O_4$ (0<a<2, 0<b<2, 0<c<2, a+b+c=2), $LiMn_{2-z}Ni_zO_4$, $LiMn_{2-z}Co_zO_4$ (0<z<2), $LiCoPO_4$ and $LiFePO_4$ or a mixture of two or more of them may be used. In addition, sulfides, selenides and halides may also be used, in addition to these oxides.

In addition, the positive electrode current collector is not particularly limited as long as it has high electrical conductivity without causing chemical changes in the battery. For example, stainless steel, aluminum, nickel, titanium, sintered carbon; or aluminum or stainless steel surface-treated with carbon, nickel, titanium, silver or the like may be used as the positive electrode current collector. At this time, the positive electrode current collector may be used in various forms such as film, sheet, foil, net, porous substance, foam or nonwoven fabric having fine irregularities formed on its surface so as to increase the adhesive force with the positive electrode active material.

In another aspect of the present disclosure, the negative electrode for the lithium secondary battery may include a negative electrode current collector and a negative electrode active material layer having a negative electrode active material formed on the negative electrode current collector.

As the negative electrode active material, lithium metal or conventionally carbon material, which is capable of intercalating and de-intercalating lithium ions, or silicon or tin, etc. may be used. Preferably, a carbon material may be used as the negative electrode active material, and both low-crystalline carbon and high-crystalline carbon may be used as the carbon material.

Representative examples of low crystalline carbon are soft carbon and hard carbon, and representative examples of high crystalline carbon are natural graphite, Kish graphite, pyrolytic carbon, mesophase pitch based carbon fiber, meso-carbon microbeads, and high temperature sintered carbon from mesophase pitches and petroleum or coal tar pitch derived cokes, etc. At this time, the negative electrode may comprise a binder. The binder may be various types of binder polymers such as vinylidene fluoride-hexafluoropropylene copolymer (PVDF-co-HFP), polyvinylidenefluoride (PVDF), polyacrylonitrile, and polymethylmethacrylate.

In addition, the negative electrode current collector is not particularly limited as long as it has high electrical conductivity without causing chemical changes in the battery. For example, the negative electrode current collector is not particularly limited as long as it has high electrical conductivity without causing chemical changes in the battery. For example, copper, stainless steel, aluminum, nickel, titanium, sintered carbon; or copper or stainless steel surface-treated with carbon, nickel, titanium, silver or the like, and aluminum-cadmium alloy and the like may be used as the negative electrode current collector. In addition, the negative electrode current collector may be used in various forms such as film, sheet, foil, net, porous substance, foam or nonwoven fabric having fine irregularities formed on its surface, in common with the positive electrode current collector.

In these cases, the positive electrode active material layer or the negative electrode active material layer may further comprise a binder resin, an electrically conductive material, a filler, and other additives. The binder resin is used for the bonding of the electrode active material and the electrically conductive material and for the bonding to the current collector. Examples of such binder resins may comprise polyvinylidene fluoride (PVDF), polyvinyl alcohol, carboxymethylcellulose (CMC), starch, hydroxypropyl cellulose, regenerated cellulose, polyvinyl pyrrolidone, polytetrafluoroethylene, polyethylene, polypropylene, ethylene-propylene-diene polymer (EPDM), sulfonated-EPDM, styrene-butadiene rubber, fluorine rubber, and various copolymers thereof.

The electrically conductive material is used to further improve the electrical conductivity of the electrode active material. The electrically conductive material is not particularly limited as long as it has electrical conductivity without causing chemical changes in the battery, and for example, graphite such as natural graphite or artificial graphite; carbon blacks such as carbon black, acetylene black, Ketjen black, channel black, furnace black, lamp black, and thermal black; electrically conductive fibers such as carbon fiber and metal fiber; carbon fluoride; metal powders such as aluminum powder and nickel powder; electrically conductive whiskers such as zinc oxide and potassium titanate; electrically conductive metal oxides such as titanium oxide; and polyphenylene derivative may be used. Preferably, the electrically conductive material may be a vapor grown carbon fiber (VGCF).

The filler is selectively used as a component for suppressing the expansion of the electrode and is not specifically limited as long as it is a fibrous material without causing chemical change in the battery, and for example, comprises olefin-based polymers such as polyethylene and polypropylene; and fibrous materials such as glass fiber and carbon fiber.

In another aspect of the present disclosure, the separator may be consisted of a porous substrate. Any porous substrate may be used as long as it is a porous substrate commonly used in electrochemical devices, and for example, a polyolefin-based porous membrane or nonwoven fabric may be used, but it is not particularly limited thereto.

Examples of the polyolefin-based porous membrane may be membranes formed of any polymer alone selected from polyethylenes such as high density polyethylene, linear low density polyethylene, low density polyethylene, and ultra-high molecular weight polyethylene, and polyolefin-based polymers such as polypropylene, polybutylene, and polypentene, or formed of a polymer mixture thereof.

In addition to the above-mentioned polyolefin-based nonwoven fabric, the nonwoven fabric may be a nonwoven fabric formed of, for example, any polymer alone selected from polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalene and the like, or formed of a polymer mixture thereof. The structure of the nonwoven fabric may be a spunbond nonwoven fabric or a melt blown nonwoven fabric composed of long fibers.

The thickness of the porous substrate is not particularly limited, but may be 1 μm to 100 μm, or 5 μm to 50 μm.

The size and porosity of the pores present in the porous substrate are also not particularly limited, but may be 0.001 μm to 50 μm and 10% to 95%, respectively.

In another aspect of the present disclosure, the electrolyte solution may be a non-aqueous electrolyte solution, and the electrolyte salt contained in the non-aqueous electrolyte solution is a lithium salt. The lithium salt is not particularly limited as long as it may be conventionally used in electrolyte solution for a lithium secondary battery. For example, the lithium salt may be at least one selected from the group consisting of LiFSI, $LiPF_6$, LiCl, LiBr, LiI, $LiClO_4$, $LiBF_4$, LiBiOClio, $LiPF_6$, $LiCF_3SO_3$, $LiCF_3CO_2$, $LiAsF_6$, $LiSbF_6$, $LiPF_6$, $LiAlCl_4$, $CH_3SO_3Li$, $CF_3SO_3Li$, $(CF_3SO_2)_2NLi$, lithium chloroborane, and 4-phenyl lithium borate.

As the organic solvent contained in the nonaqueous electrolyte solution, those conventionally used in an electrolyte solution for a lithium secondary battery may be used without limitation, and for example, ether, ester, amide, linear carbonate, cyclic carbonate, etc. may be used alone or in combination of two or more. Among them, representatively, carbonate compounds that are cyclic carbonates, linear carbonates, or slurries thereof may be comprised.

Specific examples of the cyclic carbonate compound may comprise at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a slurry of two or more thereof. Examples of such halides may comprise, but are not limited to, fluoroethylene carbonate (FEC) and the like.

In addition, specific examples of the linear carbonate compound may representatively comprise, but is not limited to, at least one selected from the group consisting of dimethyl carbonate (DMC), diethyl carbonate (DEC), dipropyl carbonate, ethylmethyl carbonate (EMC), methylpropyl carbonate, and ethylpropyl carbonate, or a slurry of two or more thereof. Particularly, among the carbonate-based organic solvents, ethylene carbonate and propylene carbonate which are cyclic carbonates are highly viscous organic solvents and have a high dielectric constant, and thus may dissociate lithium salts in the electrolyte much better. When these cyclic carbonates are mixed with linear carbonates with a low viscosity and a low dielectric constant, such as dimethyl carbonate and diethyl carbonate, at a suitable ratio, an electrolyte solution having the higher electrical conductivity may be prepared.

In addition, the ether among the above organic solvents may be, but is not limited to, any one selected from the group consisting of dimethyl ether, diethyl ether, dipropyl ether, methylethyl ether, methylpropyl ether, ethylpropyl ether, dimethoxyethane (DME) and dioxolane (DOL), or a slurry of two or more thereof.

In addition, the ester among the above organic solvents may be, but is not limited to, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a slurry of two or more thereof.

The injection of the non-aqueous electrolyte solution may be performed at an appropriate stage during the manufacturing process of the electrochemical device, depending on the manufacturing process and required physical properties of the final product. That is, such injection may be carried out before assembling the electrochemical device or in the final stage of assembling the electrochemical device.

In the case of the lithium secondary battery according to another aspect of the present disclosure, it is possible to perform laminating or stacking and folding processes of the separator and the electrode, in addition to the winding process which is a general process.

In addition, the shape of the battery case is not particularly limited, and may be of various shapes such as a cylindrical shape, a laminate shape, a square shape, a pouch shape, or a coin shape. The structure and manufacturing method of these batteries are widely known in the art, and thus detailed description thereof will be omitted.

In addition, the lithium secondary battery may be classified into various batteries, such as a lithium-sulfur secondary battery, a lithium-air battery, a lithium-oxide battery, and a lithium all-solid battery, depending on the positive electrode/negative electrode material used.

In addition, another aspect of the present disclosure provides a battery module including the lithium secondary battery as a unit cell.

The battery module may be used as a power source of medium or large-sized devices requiring high temperature stability, long cycle characteristics, and high capacity characteristics.

Examples of the medium or large-sized devices may comprise, but are not limited to, a power tool that is powered and moved by an electric motor; electric cars including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; and a power storage system.

Lithium-Sulfur Secondary Battery The sulfur-carbon composite according to another aspect of the present disclosure may be applied to a positive electrode for a lithium-sulfur secondary battery, among lithium secondary batteries.

In this case, the lithium-sulfur secondary battery may be a battery comprising the above sulfur-carbon composite as a positive electrode active material.

The sulfur-carbon composite may exhibit high ion conductivity by securing a migration path of lithium ions to the inside of the pores, and serves as a carrier for sulfur, thereby increasing the reactivity with sulfur, a positive electrode active material, to simultaneously improve the initial discharging capacity and high rate performance of a lithium-sulfur secondary battery.

Hereinafter, preferred examples are provided to help understanding of the present invention, but the following examples are only for exemplifying the present invention, and it is apparent to those skilled in the art that various changes and modifications can be made within the scope and spirit of the present invention, and such changes and modifications are within the scope of the appended claims.

Comparative Example 1

(1) Preparation of Sulfur-Carbon Composite (1-1) Combination of Carbon and Sulfur A mixture was obtained by mixing 25 wt. % of a carbon powder and 75 wt. % of a sulfur powder. In this case, the carbon powder is a powder of carbon nanotube (CNT) as linear carbon.

(1-2) Heat Treatment

The mixture obtained in (1-1) was heat-treated at 155° C. through melt diffusion to prepare a sulfur-carbon composite. At this time, the sulfur-carbon composite comprises a linear sulfur-carbon composite.

(2) Manufacture of Positive Electrode

The sulfur-carbon composite obtained in (1) as a positive electrode active material, vapor grown carbon fiber (VGCF) as an electrically conductive material, and polyvinylidene fluoride (PVDF) as a binder were mixed in a weight ratio of 8:1:1, and dispersed in water at a concentration of 20% to prepare a positive electrode slurry.

The positive electrode slurry was coated on Al foil and dried to prepare a positive electrode.

(3) Manufacture of Lithium-Sulfur Secondary Battery

A lithium-sulfur secondary battery in the form of a coin cell was prepared using lithium foil having a thickness of 50 μm as a negative electrode, the positive electrode prepared in (2) above, an electrolyte solution prepared by combining 1M LiTFSI and 3 wt. % of LiNO$_3$ with DOL/DME(1:1, v/v) as a solvent, and a polyolefin separator. At this time, DOL means dioxolane and DME means dimethoxyethane.

Example 1

(1) Preparation of Sulfur-Carbon Composite (1-1) Mixing of Carbon and Sulfur

A mixture was obtained by mixing 25 wt. % of a carbon powder and 75 wt. % of a sulfur powder. In this case, the carbon powder is a powder of 10 wt. % of reduced graphene oxide as sheet-type carbon and 90 wt. % of CNT. The specific surface area of the reduced graphene oxide is 600 m$^2$/g.

(1-2) Heat Treatment

The mixture obtained in (1-1) was heat-treated at 155° C. through melt diffusion so that sulfur was supported on the carbon to prepare a sulfur-carbon composite. At this time, the prepared sulfur-carbon composite comprises a sheet-type sulfur-carbon composite and a linear sulfur-carbon composite.

(2) Manufacture of Positive Electrode

The sulfur-carbon composite obtained in (1) as a positive electrode active material, vapor grown carbon fiber (VGCF) as an electrically conductive material, and polyvinylidene fluoride (PVDF) as a binder were mixed in a weight ratio of 8:1:1, and dispersed in water at a concentration of 20% to prepare a positive electrode slurry.

The positive electrode slurry was coated on Al foil and dried to prepare a positive electrode.

(3) Manufacture of Lithium-Sulfur Secondary Battery

A lithium-sulfur secondary battery in the form of a coin cell was prepared using lithium foil having a thickness of 50 μm as a negative electrode, the positive electrode prepared in (2) above, an electrolyte solution prepared by combining 1M LiTFSI and 3 wt. % of LiNO$_3$ with DOL/DME(1:1, v/v) as a solvent, and a polyolefin separator. At this time, DOL means dioxolane and DME means dimethoxyethane.

Examples 2 to 4

Sulfur-carbon composites, positive electrode and lithium-sulfur secondary batteries were prepared in the same manner as in Example 1, except that the content of the sheet-type carbon was 20 wt. %, 30 wt. %, and 40 wt. %, respectively, based on the total weight of carbon contained in the sulfur-carbon composite, as shown in Table 1.

Examples 5 and 6

Sulfur-carbon composites were prepared in the same manner as in Example 1, except that the components were used as described in Table 1 below. At this time, sulfur-carbon composites, positive electrodes and lithium-sulfur secondary batteries were prepared with the content of the sheet-type carbon of 26 wt. %, and 35 wt. %, respectively, based on the total weight of carbon contained in the sulfur-carbon composite, as shown in Table 1.

TABLE 1

| Unit: wt. % | Sulfur-carbon composite | | Carbon | | Sulfur Content | |
|---|---|---|---|---|---|---|
| | Content of sulfur | Content of carbon | Content of sheet-type carbon | Content of linear carbon | Content of sulfur in sheet-type composite | Content of sulfur in linear composite |
| Comparative Example 1 | 75 | 25 | 0 | 100 | 0 | 100 |
| Example 1 | 75 | 25 | 10 | 90 | 10 | 90 |
| Example 2 | 75 | 25 | 20 | 80 | 20 | 80 |
| Example 3 | 75 | 25 | 30 | 70 | 30 | 70 |
| Example 4 | 75 | 25 | 40 | 60 | 40 | 60 |
| Example 5 | 76.5 | 23.5 | 26 | 74 | 31 | 69 |
| Example 6 | 77 | 23 | 35 | 65 | 42 | 58 |

Experimental Example 1: Analysis of Performance Improvement Effect of Lithium-Sulfur Secondary Battery Experiments were conducted on the performance of lithium-sulfur secondary batteries in which sulfur-carbon composites prepared in Examples 1 to 6 and Comparative Example 1 were applied to the positive electrode, respectively. The lithium-sulfur secondary batteries manufactured in the form of coin cells were repeatedly charged/discharged at room temperature to perform charging/discharging tests. The first discharging was performed at 0.1 C, and then charging/discharging was repeated two more times in the same manner, and thereafter, charging/discharging was repeated 3 times at 0.2 C, and then charging/discharging was continuously repeated at 0.3 C/0.5 C. Through this, the initial discharging performance was evaluated by obtaining a capacity-voltage graph during the first discharging, and a high rate performance (0.3 C/0.5 C) was evaluated by obtaining a capacity change graph according to cycle repetition.

FIG. 3a is a graph showing the initial discharging performance of lithium-sulfur secondary batteries in which sulfur-carbon composites prepared in Examples 1 to 4 and Comparative Example 1 respectively were applied to the positive electrode, and FIG. 3b is a graph showing the high rate characteristics of lithium-sulfur secondary batteries in which sulfur-carbon composites prepared in Examples 1 to 4 and Comparative Example 1 respectively were applied to the positive electrode.

Referring to FIG. 3a, it can be seen that the discharging capacity per weight of sulfur was increased in lithium-sulfur secondary batteries of Examples 1 to 4 containing both sheet-type carbon and linear carbon, as compared to Comparative Example 1 containing only linear carbon without sheet-type carbon. It was confirmed that among Examples 1 to 4, as the content of sheet-type carbon increases, the discharging capacity increases, and thus the discharging capacity of Example 3 with the content of sheet-type carbon of 30 wt. % is the highest. On the other hand, it was confirmed that the content of sheet-type carbon becomes 40 wt. % as in Example 4 exceeding 30 wt. %, the discharging capacity is no longer increased.

Also, referring to FIG. 3b, it can be seen that even if the charging/discharging rate is different, the discharging capacity of Example 3 with the content of sheet-type carbon of 30 wt. % is the highest as in the initial discharge performance curve of FIG. 3a. Similarly, it was confirmed that if the content of sheet-type carbon becomes 40 wt. % as in Example 4, the discharging capacity is no longer increased.

FIG. 4a is a graph showing the initial discharging performance of lithium-sulfur secondary batteries in which sulfur-carbon composites prepared in Examples 5 and 6 and Comparative Example 1, respectively were applied to the positive electrode, and FIG. 4b is a graph showing the result of the high rate characteristics measured in lithium-sulfur secondary batteries in which sulfur-carbon composites prepared in Examples 5 and 6 and Comparative Example 1, respectively were applied to the positive electrodes.

Referring to FIG. 4a, it can be seen that in Examples 5 and 6, even though the sulfur content of the sheet-type carbon composite was higher and thus the total sulfur content was higher, the discharging capacity compared to the total sulfur weight is increased, as compared to Comparative Example 1. However, it was confirmed that if the content of sheet-type carbon is increased and the total sulfur content is increased as in Example 6, the increase in discharging capacity stops. Therefore, it can be seen that when the sulfur content in the sheet-type sulfur-carbon composite is higher than that in the linear sulfur-carbon composite based on the total weight of sulfur contained in the sulfur-carbon composite, higher energy density can be realized.

Also, referring to FIG. 4b, it can be seen that the discharging capacity of Example 5 at a high rate is highest as in the initial discharge performance curve of FIG. 4a.

Experimental Example 2: Observation of the Shape of Sulfur-Carbon Composite Depending on the Content of Sheet-Type Carbon FIG. 5 is a picture by a scanning electron microscope (SEM, JSM7200 by JEOL) of sulfur-carbon composites prepared in Examples 2 to 4, respectively.

The sulfur-carbon composites of Example 2, Example 3 and Example 4 are the cases where the content of reduced graphene oxide as sheet-type carbon is 20 wt. %, 30 wt. % and 40 wt. %, respectively, based on the total weight of carbon.

Referring to FIG. 5, it can be seen that all of Example 2, Example 3, and Example 4 contain sheet-type carbon (indicated in white) in an appropriate amount, so that the leaching of sulfur can be prevented, but in the case of Example 4, the content of sheet-type carbon is relatively higher than that of Examples 2 and 3, indicating a structure in which ion transfer is somewhat difficult.

DESCRIPTION OF SYMBOL

1: Positive electrode
10: Positive electrode active material layer
20: Current collector
11: Sheet-type sulfur-carbon composite
12: Dot-type sulfur-carbon composite
13: Linear sulfur-carbon composite
S0, S1, S2: Sulfur
C0: Dot-type carbon, C1: Linear carbon, C2: Sheet-type carbon

The invention claimed is:
1. A sulfur-carbon composite, comprising:
carbon, said carbon comprising sheet-type carbon, wherein the sheet-type carbon is present in an amount of more than 0 wt. % and less than 50 wt. % based on a total weight of the carbon; and sulfur,
wherein the carbon further comprises dot-type carbon and linear carbon; and
wherein a specific surface area of the sheet-type carbon is larger than a sum of a specific surface area of the dot-type carbon and a specific surface area of the linear carbon.

2. The sulfur-carbon composite according to claim 1, wherein the sheet-type carbon is present in an amount of 10 to 30 wt. % based on the total weight of the carbon.

3. The sulfur-carbon composite according to claim 1, wherein the sheet-type carbon is selected from the group consisting of graphene oxide, reduced graphene oxide, doped graphene, and carbon nanoribbon.

4. The sulfur-carbon composite according to claim 1, wherein the dot-type carbon is present and is selected from the group consisting of Ketjen black, Denka black, acetylene black, Super-p, and fullerene.

5. The sulfur-carbon composite according to claim 1, wherein the linear carbon is present and is selected from the group consisting of carbon nanotube and carbon fiber.

6. The sulfur-carbon composite according to claim 1, wherein
the sheet-type carbon has a from in which sulfur is supported between the sheet-type carbon,
the dot-type carbon, when present, has a form in which sulfur is present on a surface of the dot-type carbon, and
the linear carbon, when present, has a form in which sulfur is present on an inside, a surface, or the inside and the surface of the linear carbon.

7. The sulfur-carbon composite according to claim 1, wherein the sulfur-carbon composite comprises 40 to 95 wt. % of sulfur and 5 to 60 wt. % of carbon.

8. A positive electrode for a lithium secondary battery comprising the sulfur-carbon composite of claim 1.

9. A lithium secondary battery comprising the positive electrode according to claim 8.

10. The lithium secondary battery according to claim 9, wherein the lithium secondary battery is a lithium-sulfur secondary battery.

11. The sulfur-carbon composite according to claim 1, wherein the specific surface area of the sheet-type carbon is 200 $m^2$/g to 1000 $m^2$/g.

12. The sulfur-carbon composite according to claim 1, wherein at least one carbon selected from the dot-type carbon and the linear carbon is present in an amount of 50 wt. % or more, and less than 100 wt. % relative to the total weight of the carbon.

* * * * *